(12) United States Patent
Sterin (10) Patent No.: US 7,395,363 B2
(45) Date of Patent: Jul. 1, 2008

(54) METHODS AND APPARATUS FOR MULTIPLE BIT RATE SERIAL COMMUNICATION

(75) Inventor: Eli Sterin, Nofit (IL)

(73) Assignee: Intel Corporation, Santa Clara, CA (US)

( * ) Notice: Subject to any disclaimer, the term of this patent is extended or adjusted under 35 U.S.C. 154(b) by 805 days.

(21) Appl. No.: 10/936,556

(22) Filed: Sep. 9, 2004

(65) Prior Publication Data

US 2006/0050707 A1    Mar. 9, 2006

(51) Int. Cl.
*G06F 13/00* (2006.01)

(52) U.S. Cl. .................. 710/305; 370/394; 710/65; 710/68; 710/72

(58) Field of Classification Search .......... 710/65, 710/68, 72, 305; 370/394, 477
See application file for complete search history.

(56) References Cited

U.S. PATENT DOCUMENTS

| 6,184,714 | B1 | 2/2001 | Kirsch et al. | |
|---|---|---|---|---|
| 6,275,067 | B1 | 8/2001 | Kirsch et al. | |
| 6,300,795 | B1 | 10/2001 | Kirsch et al. | |
| 6,320,417 | B1 | 11/2001 | Kirsch et al. | |
| 6,421,357 | B1* | 7/2002 | Hall | 370/479 |
| 6,690,757 | B1* | 2/2004 | Bunton et al. | 375/371 |
| 6,963,532 | B1* | 11/2005 | Dent | 370/208 |
| 2002/0110203 | A1 | 8/2002 | Sarkar | |
| 2003/0128767 | A1 | 7/2003 | Kudoh | |

FOREIGN PATENT DOCUMENTS

| JP | 2002204280 | 7/2002 |
|---|---|---|
| TW | 00377412 | 12/1999 |
| TW | 00436704 | 5/2001 |
| TW | 00501018 | 9/2002 |
| WO | WO 0161954 | 8/2001 |

OTHER PUBLICATIONS

Budruk, Ravi; Anderson, Don; and Shanley, Tom; PCI Express System Architecture; MindShare, Inc., copyright 2004, pp. 93,400-401, and 419-421.*

(Continued)

*Primary Examiner*—Glenn A. Auve
(74) *Attorney, Agent, or Firm*—Pearl, Cohen, Zedek, Latzer, LLP (57) ABSTRACT

Symbols are prepared for transmission by representing each bit of the symbols by a cluster of consecutive bits, identical to the bit, in a transmission bit sequence. The transmission bit sequence is transmitted at a particular bit rate. A reception bit sequence of received bits is received at the particular bit rate, and the reception bit sequence is identical to the transmission bit sequence in the absence of errors. The symbols are reconstructed from the reception bit sequence of received bits by identifying boundaries of clusters of received bits in the reception bit sequence and selecting an inner bit of each of the clusters of received bits as a bit of a reconstructed symbol. The boundary identification involves comparing neighboring received bits. The transmission of the transmission bit sequence and reception of the reception bit sequence may conform to the Peripheral Components Interconnect (PCI) Express Specifications.

27 Claims, 4 Drawing Sheets

OTHER PUBLICATIONS

U.S. Appl. No. 10/629,967, filed Jul. 30, 2003, Kwa et al.

R. Tielert: "High Speed I/O Circuits (suited for advanced sub-µm CMOS Technologies)" 2003, TU Kaiserslautern, XP 002360106: Retrieved from the internet: URL:http://mikro.ee.tu-berlin.de/ifm/AW/HandOuts /tielert.pdf> retrieved on Dec. 20, 2005.

Brewer, Sekel: "PCI Express Technology" Feb. 2004, Dell, XP002360058. Retrieved from the internet: URL:http://www.dell.com/downloads/global/vectors/2004_pciexpress.pdf> retrieved on Dec. 19, 2005.

International Search Report for Application No. PCT/US2005/031560 mailed Jan. 5, 2006.

Taiwanese Search Report for Application No. 94130717 received on Nov. 2, 2007.

* cited by examiner

METHODS AND APPARATUS FOR MULTIPLE BIT RATE SERIAL COMMUNICATION

BACKGROUND OF THE INVENTION

Electrical signals, whether carried by a wired or a wireless medium, may interact and may deform one another. Such deformations of a signal may cause a temporary faulty condition or misinterpretation of information in a system using that signal. Specifically, electrical signals that are carried by a wired medium and are related to high bit rate communication between integrated circuits may interfere with the reception and/or the transmission of electrical signals that are carried by a wireless medium and are related to wireless communication.

For example, wired communications that conform to, for example, the Peripheral Components Interconnect (PCI) Express specifications Revision 1.0a published Mar. 31, 2003 by the PCI Special Interest Group (SIG), and working at a bit rate of 2.5 GHz, may interfere with wireless communication working at a carrier frequency substantially equal to 2.4 GHz.

BRIEF DESCRIPTION OF THE DRAWINGS

Embodiments of the invention are illustrated by way of example and not limitation in the figures of the accompanying drawings, in which like reference numerals indicate corresponding, analogous or similar elements, and in which.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION OF EMBODIMENTS OF THE INVENTION

In the following detailed description, numerous specific details are set forth in order to provide a thorough understanding of embodiments of the invention. However it will be understood by those of ordinary skill in the art that the embodiments of the invention may be practiced without these specific details. In other instances, well-known methods, procedures, components and circuits have not been described in detail so as not to obscure the embodiments of the invention.

Figure 1:
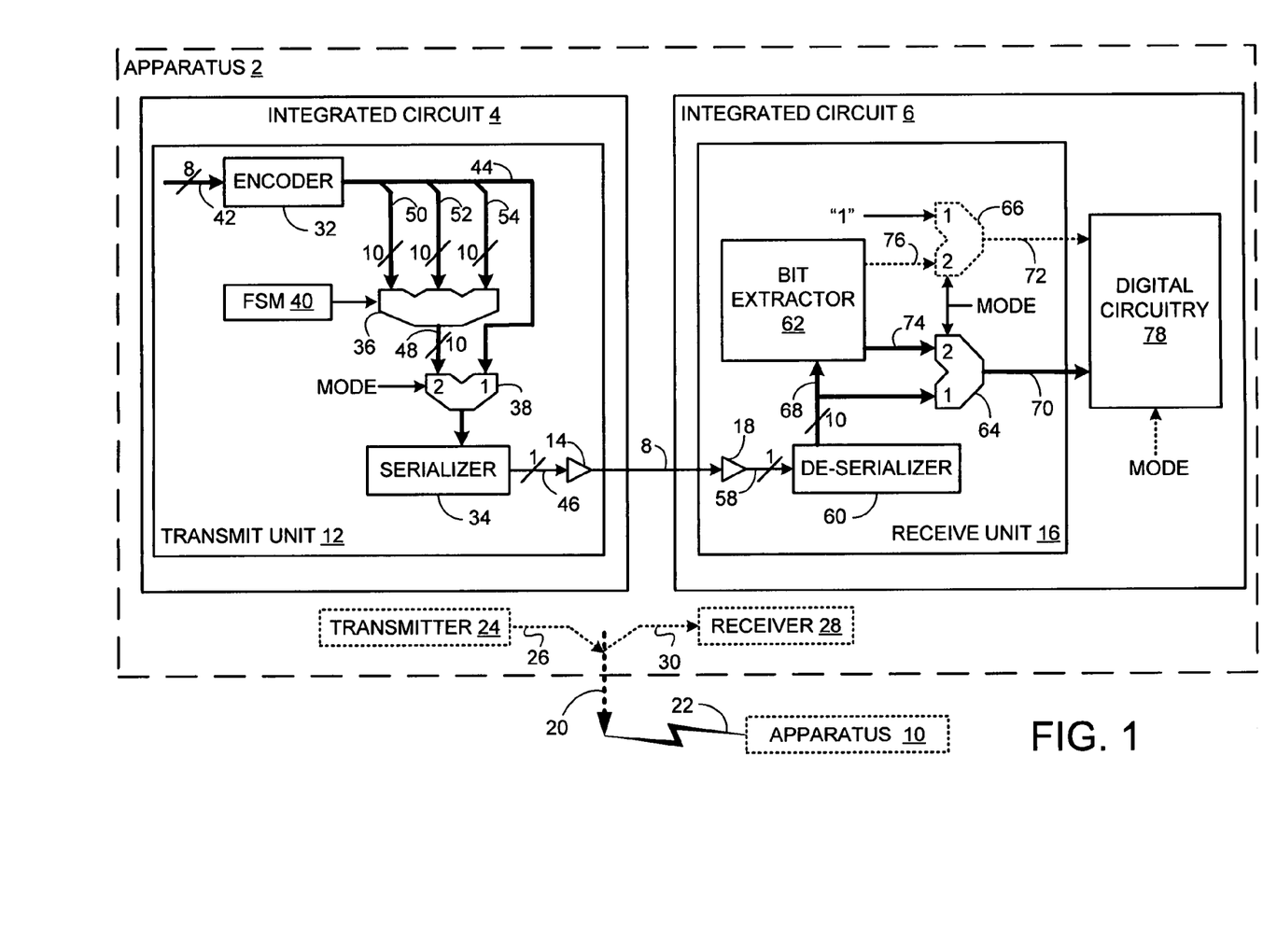
FIG. 1 is a simplified block diagram of an apparatus including two integrated circuits capable of communicating over a conductive medium, and an optional additional apparatus, in accordance with some embodiments of the present invention.

FIG. 1 is a simplified block diagram of an apparatus 2 including integrated circuits 4 and 6 capable of communicating over a conductive medium 8, and an optional apparatus 10, in accordance with some embodiments of the present invention.

A non-exhaustive list of examples for apparatus 2 includes a desktop personal computer, a work station, a server computer, a laptop computer, a notebook computer, a hand-held computer, a personal digital assistant (PDA), a mobile telephone, a cellular radiotelephone, a game console, a digital camera, a digital video camera, a television set, a docking station for a laptop computer, a personal computer card (PC card), a communication switch, a communication router, a communication server, and the like.

A non-exhaustive list of examples for integrated circuit 4 and for integrated circuit 6 includes a field programmable gate array (FPGA), an application specific integrated circuit (ASIC), an application specific standard product (ASSP), a central processing unit (CPU), a digital signal processor (DSP), a reduced instruction set computer (RISC), a complex instruction set computer (CISC), a graphics processor, a network processor, a switch, a framer, a memory controller hub (MCH), an input/output controller hub (ICH), a bridge, a north bridge, a south bridge, a local area network (LAN) device, a wireless local area network (WLAN) device, a peripheral device and the like.

Integrated circuit 4 may include a transmit unit 12 that may include a line driver 14 to drive electrical signals over conductive medium 8, and integrated circuit 6 may include a receive unit 16 that may include a line receiver 18 to receive electrical signals from conductive medium 8.

For example, conductive medium 8 may be a differential pair of a printed circuit board (PCB) traces, line driver 14 may be a differential driver, line receiver 18 may be a differential receiver, and the electrical signals may be low voltage differential signaling (LVDS) signals.

Although the invention is not limited in this respect, transmit unit 12, receive unit 16, and the corresponding electrical signals sent by line driver 14 over conductive medium 8 may conform to the Peripheral Components Interconnect (PCI) Express specifications Revision 1.0a published Mar. 31, 2003 by the PCI Special Interest Group (SIG) and/or to successors of those specifications, and/or to other standards related to those specifications or to successors thereof. Moreover, transmit unit 12 may be capable of transmitting electrical signals over conductive medium 8 at a bit rate substantially equal to 2.5 Gigabits per second (Gbps).

Integrated circuit 4 may be able to communicate with integrated circuit 6 over additional conductive media, more than one transmit unit may be present in integrated circuit 4 and/or integrated circuit 6, and more than one receive unit may be present in integrated circuit 4 and/or integrated circuit 6. Such additional conductive media, transmit units and receive units are not shown in FIG. 1 so as not to obscure the description of embodiments of the invention.

Apparatus 2 may include an antenna 20 and may be able to communicate with optional apparatus 10 over a wireless communication channel 22. Apparatus 2 may optionally include a transmitter 24 to output a radio frequency (RF) signal 26 to be transmitted by antenna 20 over wireless communication channel 22, and may optionally include a receiver 28 to receive a radio frequency (RF) signal 30 received by antenna 20 from wireless communication channel 22.

A non-exhaustive list of examples for antenna 20 includes a dipole antenna, a loop antenna, a shot antenna, a dual antenna, a omni-directional antenna and any other suitable antenna.

Although the invention is not limited in this respect, apparatuses 2 and 10 may be part of a cellular communication system, with one of apparatuses 2, 10 being a base station and the other a mobile station or with both apparatuses 2 and 10 being mobile stations or base stations.

Alternatively, and although the invention is not limited in this respect, apparatuses 2 and 10 may be part of a wireless local area network (WLAN), with one of apparatuses 2, 10 being a stationary station and the other a mobile station, or with both apparatuses 2 and 10 being mobile stations or stationary stations.

A non-exhaustive list of examples for types of WLAN intended to be within the scope of the invention includes WLANs that meet the following standards or other existing or future related standards:

ANSI/IEEE standard 802.11 for Wireless LAN Medium Access Control (MAC) and Physical layer (PHY) specifications:

Rev. a for Higher-speed physical layer extension in the 5 GigaHertz (GHz) band, published 1999, Rev. b for Higher-speed physical layer extension in the 2.4 GHz band, published 1999, Rev. g for Higher data rate extension in the 2.4 GHz band, published 2003, BLUETOOTH™ core specifications v 1.2, published November 2003 by the BLUETOOTH™ special interest group (SIG); and IEEE standard draft 802.15.4 for low data rate WLAN, published May 2003.

Transmit unit 12 may be capable of transmitting electrical signals over conductive medium 8 at an effective bit rate substantially equal to third of 2.5 Gbps, i.e. 833.33 Mega bits per second (Mbps), and receive unit 16 may be capable of receiving electrical signals from conductive medium 8 at an effective bit rate substantially equal to 833.33 Mbps.

In some situations, electrical signals transmitted by transmit unit 12 over conductive medium 8 at a bit rate substantially equal to 833.33 Mbps may induce less interference to signals received or transmitted by antenna 20 over wireless communication channel 22 at a carrier frequency substantially equal to 2.4 GHz than electrical signals transmitted by transmit unit 12 over conductive medium 8 at a bit rate substantially equal to 2.5 Gbps.

Figure 2:
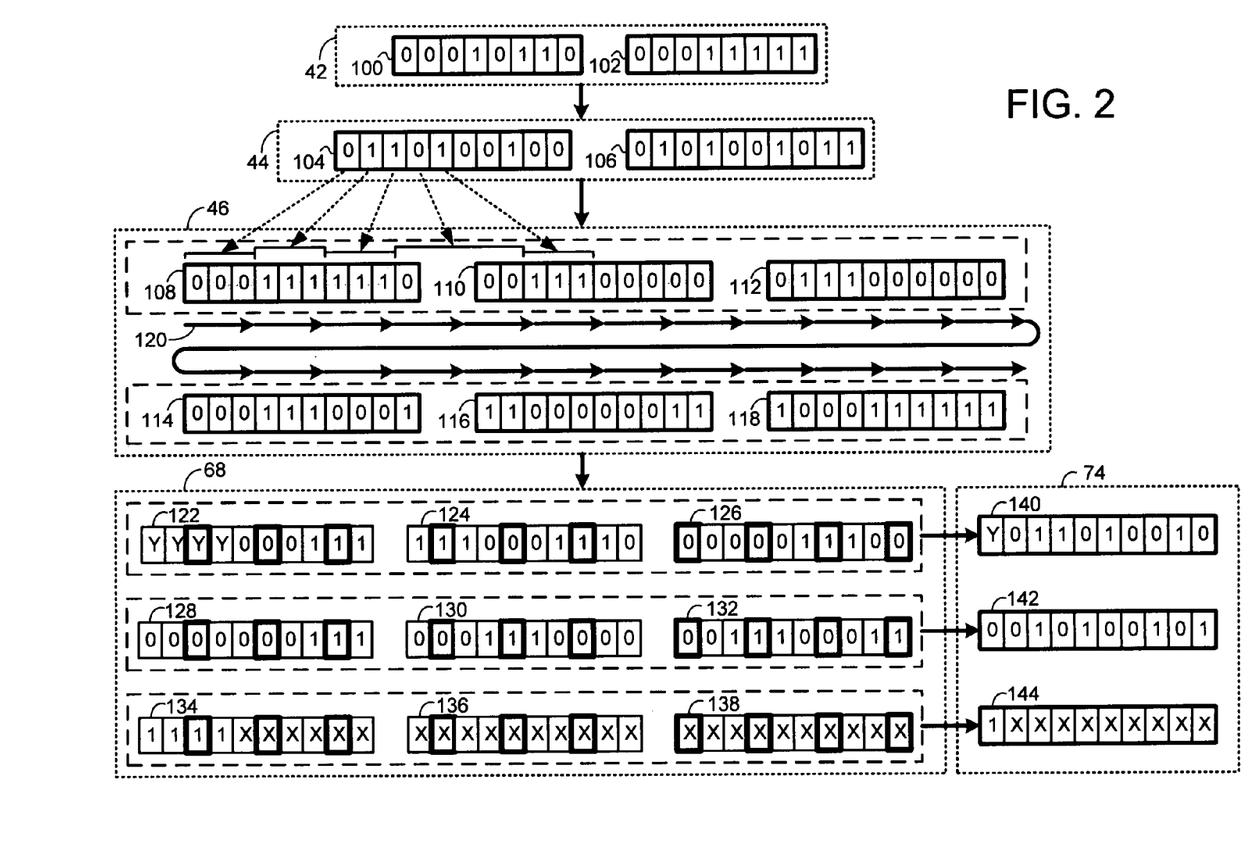
FIG. 2 is an exemplary simplified scheme of bit propagation in a transmit unit and in a receive unit operating in a reduced effective bit rate mode, in accordance with some embodiments of the present invention.

Reference is now made in addition to FIG. 2, which is an exemplary simplified bits propagation scheme in transmit unit 12 and receive unit 16 operating in the reduced effective bit rate mode (defined hereinbelow), in accordance with some embodiments of the present invention.

Transmit unit 12 may comprise an encoder 32, a serializer 34, a multiplexer (MUX) 36, a MUX 38 and a Finite State Machine (FSM) 40. Encoder 32 may receive information bits 42 and may output encoded symbols 44. Encoder 32 may encode bytes of eight information bits 42 into encoded symbols 44 of ten bits, using, for example, an "8b/10b" transmission code as defined in standard ANSI X3.230-1994 published Jan. 1, 1994. For example, as shown in FIG. 2, encoder 32 may encode byte 100 of information bits 42 into a 10-bit encoded symbol 104 and byte 102 of information bits 42 into a 10-bit encoded symbol 106.

In the description hereinbelow, single bits of a 10-bit Encoded Symbol (ES) are referred to as "ES/9","ES/8", "ES/7", "ES/6", "ES/5", "ES/4", "ES/3", "ES/2", "ES/1" and "ES/0", respectively.

Apparatus 2 may have at least two communication modes, and the operation of MUX 38 may be determined, at least in part, by the communication mode.

In a first communication mode, encoder 32 may output encoded symbols 44 at a rate of, for example, 250 Mega encoded symbols per second, and MUX 38 may pass encoded symbols 44 to serializer 34. Serializer 34 may receive encoded symbols 44 and may serially output bits of a respective serial bit stream 46, in which single bits of encoded symbols 34 may be represented by respective single bits. The effective bit rate in which serializer 34 outputs serial bit stream 46 may be 2.5 Gbps.

In a second communication mode, encoder 32 may output encoded symbols 44 at a rate of, for example, one third of the rate of the first communication mode, e.g. 83.33 Mega encoded symbols per second.

A 10-bit bus 50 may carry the following string of bits of encoded symbols 44: ES/9-ES/9-ES/9-ES/8-ES/8-ES/8-ES/7-ES/7-ES/7-ES/6.

In addition, a 10-bit bus 52 may carry the following string of bits of encoded symbols 44: ES/6-ES/6-ES/5-ES/5-ES/5-ES/4-ES/4-ES/4-ES/3-ES/3.

Furthermore, a 10-bit bus 54 may carry the following string of bits of encoded symbols 44: ES/3-ES/2-ES/2-ES/2-ES/1-ES/1-ES/1-ES/0-ES/0-ES/0.

MUX 36 may be capable of passing one of buses 50, 52 and 54 to a 10-bit bus 48. Under control of FSM 40, in response to encoder 32 outputting an encoded symbol of encoded symbols 44, MUX 36 may pass to bus 48 the string carried by bus 50, followed by the string carried by bus 52, followed by the string carried by bus 54. FSM 40 may control MUX 36 to switch between buses 50, 52 and 54 at a frequency that may be equal to the rate at which encoder 32 outputs encoded symbols 44 in the first communication mode, e.g. 250 MHz.

Consequently, encoded symbols 44 that are outputted from encoder 32 at a rate of 83.33 Mega encoded symbols per second may be represented on bus 48 by corresponding three 10-bit strings outputted from MUX 36 at a rate of 250 Mega strings per second, and clusters of three equal bits in those three strings may each represent corresponding single bits of encoded symbols 44.

Serializer 34 may receive strings from bus 48 and may serially output bits of strings received from bus 48 to a serial bit stream 46, in which, each cluster of three consecutive equal bits represents a single bit of an encoded symbol 44. For example, as shown in FIG. 2, 10-bit encoded symbol 104 may be represented in serial bit stream 46 by groups 108, 110 and 112 of ten bits each, received by serializer 34 from bus 50, 52 and 54, respectively. 10-bit encoded symbol 106 may be represented in serial bit stream 46 by groups 114, 116 and 118 of ten bits each, received by serializer 34 from bus 50, 52 and 54, respectively. In serial bit stream 46, bits of strings may be outputted at a rate of 2.5 Gbps, similar to the bit rate in the first communication mode, and consequently, in serial bit stream 46, clusters may be outputted at a rate of 833.33 Mega cluster per second. Serializer 34 may output group 108, then group 110, then group 112, then group 114, then group 116, then group 118, as represented by the direction of an arrow 120.

It should be noted that since in serial bit stream 46, each cluster of three consecutive equal bits may represent a single bit of an encoded symbol 44, serial bit stream 46 may carry bits of encoded symbols 44 at an effective bit rate of 833.33 Mbps.

The effective bit rates at which bits of encoded symbols 44 are carried by serial bit stream 46 in the first and the second communication modes are denoted hereinbelow the "basic effective bit rate" and the "reduced effective bit rate", respectively. The first communication mode is denoted hereinbelow as the basic effective bit rate mode, and the second communication mode is denoted hereinbelow as the reduced effective bit rate mode In both the communication modes, line driver 14 may receive serial bit stream 46 and may drive corresponding electrical signals over conductive medium 8. Line receiver 18 may receive electrical signals from conductive medium 8 and may output a serial bit sequence 58, which may be a substantial reproduction of serial bit stream 46. It will be appreciated that the probability of a bit of serial bit stream 46 to be reproduced incorrectly in serial bit sequence 58 may be substantially low, and may be, for example, approximately $10^{-12}$ or $10^{-14}$.

Receive unit 16 may comprise a de-serializer 60, a bit extractor 62 and a MUX 64. The operation of MUX 64 may be determined, at least in part, by the communication mode of receive unit 16.

De-serializer 60 may receive serial bit sequence 58, may pack bits of serial bit sequence 58 into words, and may output a word sequence 68 of those words. The word size may, for example, be equal the encoded symbol size, e.g. 10 bits. Consequently, de-serializer 60 may output words at a word rate of 250 Mega words per second.

In the basic effective bit rate mode, a 10-bit encoded symbol may be represented by a corresponding ten bits contained in one or two words of word sequence 68, and MUX 64 may be set to pass word sequence 68 to signals 70 at a word rate of 250 Mega words per second. Even though the number of bits in a word may equal the number of bits in an encoded symbol, encoded symbols may not necessarily be aligned with words. Digital circuitry 78 may be set to operate at 250 MHz to receive word sequence 68 at a word rate of 250 Mega words per second from signals 70, and may extract encoded symbols from word sequence 68 by determining boundaries of the encoded symbols within word sequence 68.

In the reduced effective bit rate mode, as explained hereinabove, a single bit of an encoded symbol may be represented by a cluster of bits in word sequence 68, e.g. three bits, and consequently, an encoded symbol may be represented by corresponding three 10-bit strings contained in three or four words of word sequence 68. For example, as shown in FIG. 2, word sequence 68 may include word 122, then word 124, then word 126, then word 128, then word 130, then word 132, then word 134, then word 136, then word 138. Encoded symbol 104 is represented by three 10-bit strings contained in words 122, 124, 126 and 128. Encoded symbol 106 is represented by three 10-bit strings contained in words 128, 130, 132 and 134. Even though the number of bits in a word may equal the number of bits in a string, strings may not necessarily be aligned with words. For example, word 122 includes bits representing encoded symbol 104, but also four bits, denoted "Y", representing a different encoded symbol that precedes encoded symbol 104 in serial bit stream 46. Similarly, word 134 includes bits representing encoded symbol 106, but also six bits, denoted "X", representing a different encoded symbol that follows encoded symbol 106 in serial bit stream 46.

Bit extractor 62 may receive word sequence 68, may extract single bits of encoded symbols from respective clusters of word sequence 68, may pack these extracted bits into extracted words, and may output these extracted words in an extracted word sequence 74, in which single bits of an encoded symbol are represented by a corresponding single bit. MUX 64 may be set to pass extracted word sequence 74 to signals 70, and digital circuitry 78 may receive extracted word sequence 74 from signals 70. For example, as shown in FIG. 2, bit extractor 62 selects the bits marked in bold lines from words 122, 124 and 126 and outputs an extracted word 140 containing the selected bits. Similarly, bit extractor 62 selects the bits marked in bold lines from words 128, 130 and 132 and outputs an extracted word 142 containing the selected bits, after outputting extracted word 140. Similarly, bit extractor 62 selects the bits marked in bold lines from words 134, 136 and 138 and outputs an extracted word 144 containing the selected bits, after outputting extracted word 142.

According to some embodiments of the invention, in the reduced effective bit rate mode, the extracted word rate may equal the word rate divided by the cluster size, e.g. 83.33 Mega extracted words per second, and a particular extracted word may be presented on signals 70 for a period of substantially 12 nanoseconds. Digital circuitry 78 may be controlled at least according to the communication mode. In the basic effective bit rate mode, digital circuitry 78 may be set to operate at 250 MHz to receive word sequence 68 at a word rate of 250 Mega words per second, and in the reduced effective bit rate mode, digital circuitry 78 may be set to operate at 83.33 MHz to receive extracted word sequence 74 at a rate of 83.33 Mega extracted words per second and may extract encoded symbols from extracted word sequence 74 by determining boundaries of the encoded symbols within extracted word sequence 74.

According to other embodiments of the invention, in the reduced effective bit rate mode, the extracted word rate may equal the word rate divided by the cluster size, e.g. 83.33 Mega extracted words per second, and a particular extracted word may be presented on signals 70 for a time period that equals the period corresponding to the extracted word rate divided by the number of bits in a cluster, e.g. substantially 4 nanoseconds. Bit extractor 62 may output a signal 76 to qualify extracted words by, for example, having a logic value "1" during the 4 nanoseconds an extracted word is presented on signals 70, and by having a logic value "0" otherwise. Receive unit 16 may comprise a MUX 66 to receive signal 76, and when in the reduced effective bit rate mode, to pass signal 76 to a signal 72. In the reduced effective bit rate mode, digital circuitry 78 may be set to operate at substantially the same frequency as in the basic effective bit rate mode, e.g. 250 MHz, and may receive extracted word sequence 74 at a rate of 83.33 Mega extracted words per second. Digital circuitry 78 may receive signal 72, and may extract encoded symbols from extracted word sequence 74 by determining boundaries of the encoded symbols within extracted word sequence 74 using signal 72.

In the basic effective bit rate mode, MUX 66 may be set to pass a substantially constant logical value "1" to signal 72.

Figure 3:
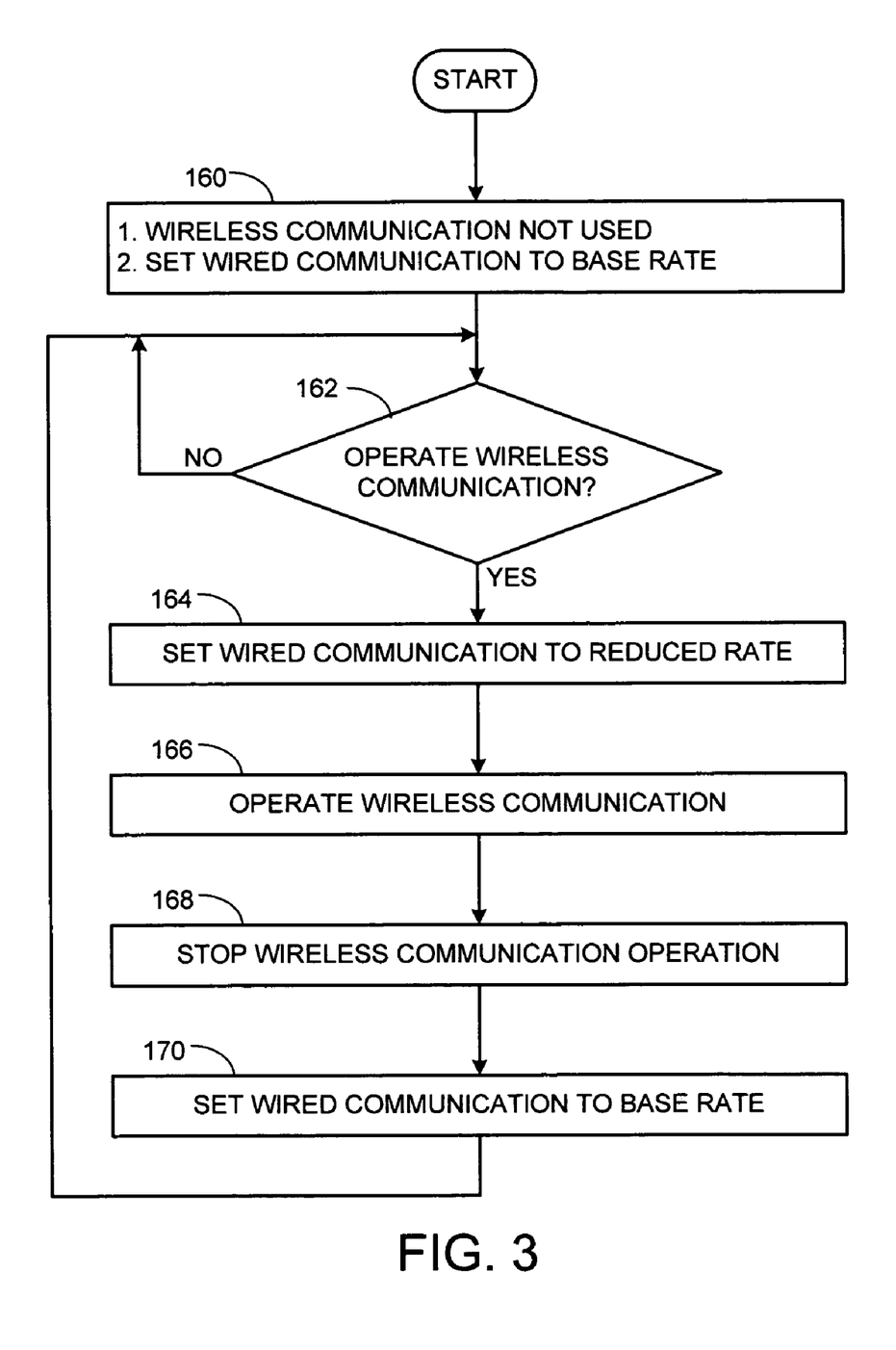
FIG. 3 is a flowchart of an exemplary method for controlling the bit rate of communication over a conductive medium, according to some embodiments of the invention.

FIG. 3 is a flowchart of an exemplary method for controlling the bit rate of communication over a conductive medium, according to some embodiments of the invention.

At an initial stage, the wireless communication is not yet in use, and the wired communication is set to work at its basic effective bit rate, e.g. 2.5 GHz (160). As long as communication over the wireless medium is not required, the wired communication may remain configured to work at its basic effective bit rate (162). However, if communication over the wireless medium should occur, the wired communication is set to work at its reduced effective bit rate, e.g. 833.33 Hz (164), and a wireless communication session may then begin (166). After the wireless communication session is completed (168), the wired communication is set to work at its basic effective bit rate (170), and the method may resume from block 162.

Figure 4:
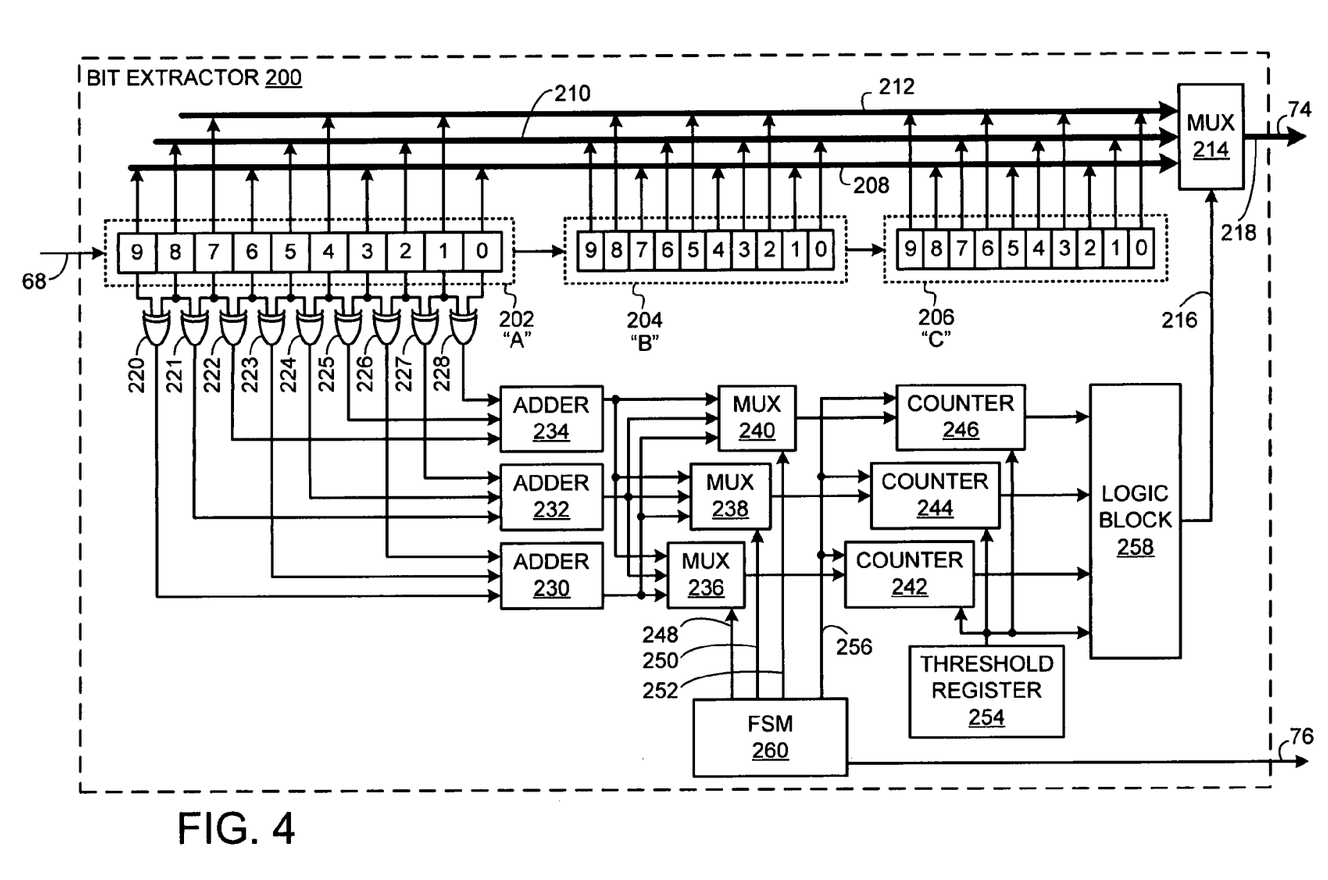
FIG. 4 is a simplified block diagram of an exemplary bit extractor, in accordance with some embodiments of the invention.

FIG. 4 is a simplified block diagram of an exemplary bit extractor 200, in accordance with some embodiments of the invention. Bit extractor 200 may receive word sequence 68, in which, at the reduced effective bit rate mode, bits of 10-bit encoded symbols are represented by corresponding clusters of three consecutive equal bits. Bit extractor 200 may generate and output extracted word sequence 74 in which, at the reduced effective bit rate mode, bits of the encoded symbols are represented by corresponding single bits. In addition, bit extractor 200 may generate and output signal 76.

Bit extractor 200 may comprise memory elements 202, 204 and 206, that may be, for example, registers or latches, and may each comprise ten bits. In general, the number of memory elements may be equal to the number of bits in a cluster, and the number of bits in each memory element may be equal to the number of bits in an encoded symbol.

For the clarity of explanation, memory elements 202, 204 and 206 are referred to hereinbelow as "register A", "register B" and "register C", respectively. Furthermore, bits in registers A, B and C are referred to using the numbers 0, 1, 2, 3, 4, 5, 6, 7, 8 and 9. For example, bit number 7 in register B is referred to as bit B/7.

Register A may be capable of capturing and storing ten consecutive bits of word sequence 68. Register B may be capable of capturing and storing the value of register A, and register C may be capable of capturing and storing the value of register B.

A 10-bit bus 208 may comprise bits A/9, A/6, A/3, A/0, B/7, B/4, B/1, C/8, C/5 and C/2, a 10-bit bus 210 may comprise bits A/8, A/5, A/2, B/9, B/6, B/3, B/0, C/7, C/4 and C/1, and a 10-bit bus 212 may comprise bits A/7, A/4, A/1, B/8, B/5, B/2, C/9, C/6, C/3 and C/0.

A MUX 214 may receive signals 216 and buses 208, 210 and 212 as inputs, and may pass one of buses 208, 210 and 212 to a 10-bit bus 218 according to a value on signals 216.

Bit extractor 200 may comprise comparators 220, 221, 222, 223, 224, 225, 226, 227 and 228 that may be, for example, XOR gates having two inputs and one output. The logical value of the output of one of comparators 220, 221, 222, 223, 224, 225, 226, 227 and 228 may be, for example, logic "1" if the logical values of its two inputs is not equal, and logic "0" if the logical values of its two inputs is equal.

Comparator 220 may compare bit A/9 to bit A/8, comparator 221 may compare bit A/8 to bit A/7, comparator 222 may compare bit A/7 to bit A/6: comparator 223 may compare bit A/6 to bit A/5, comparator 224 may compare bit A/5 to bit A/4, comparator 225 may compare bit A/4 to bit A/3, comparator 226 may compare bit A/3 to bit A/2, comparator 227 may compare bit A/2 to bit A/1, and comparator 228 may compare bit A/1 to bit A/0.

Comparators 220, 221, 222, 223, 224, 225, 226, 227 and 228 may form three groups of three comparators each. The first group may comprise comparators 220, 223 and 226, the second group may comprise comparators 221, 224 and 227, and the third group may comprise comparators 222, 225 and 228.

Bit extractor 200 may comprise adders 230, 232 and 234. Adder 230 may receive the outputs of comparators 220, 223 and 226 and may output a number that is equal to the number of comparators 220, 223 and 226 having non-equal inputs. Similarly, adder 232 may receive the outputs of comparators 221, 224 and 227 and may output a number that is equal to the number of comparators 221, 224 and 227 having non-equal inputs. In addition, adder 234 may receive the outputs of comparators 222, 225 and 228, and may output a number that is equal to the number of comparators 222, 225 and 228 having non-equal inputs.

Bit extractor 200 may comprise MUXs 236, 238 and 240 and may comprise counters 242, 244 and 246. MUXs 236, 238 and 240 may receive as inputs signals 248, 250 and 252, respectively, and may receive as inputs the outputs of adders 230, 232 and 234. MUX 236 may output the output of one of adders 230, 232 and 234 according to a value received on signal 248. Similarly, MUX 238 may output the output of one of adders 230, 232 and 234 to counter 244 according to a value received on signal 250, and MUX 240 may output the output of one of adders 230, 232 and 234 to counter 246 according to a value received on signal 252.

Counters 242, 244 and 246 may be capable of containing values that are no less than a lower threshold that may be, for example, the number zero, and no more than an upper threshold, that may be, for example, a value stored in a threshold register 254. Counters 242, 244 and 246 may be capable of changing their values in response to a command received on a signal 256 and in respect to the outputs of MUXs 236, 238 and 240, respectively.

Counter 242 may increment the value it contains by one, for example, if the output of MUX 236 is equal to zero. Similarly, counter 244 may increment the value it contains by one, for example, if the output of MUX 238 is more than zero, and may decrement the value it contains if the output of MUX 238 is equal to zero. Moreover, counter 246 may increment the value it contains by one, for example, if the output of MUX 240 is more than zero, and may decrement the value it contains if the output of MUX 240 is equal to zero.

In general, the number of groups of comparators, the number of adders, the number of MUXs, and the number of counters may all be equal to the number of bits in a cluster.

A logic block 258 may receive the values stored in counters 242, 244 and 246, may receive the value of threshold register 254, and may output signals 216 to multiplexer 214. If counter 242 has a value that is higher than the values of counters 244 and 246, logic block 258 may control MUX 214 to pass bus 212 to bus 218. If counter 244 has a value that is higher than the values of counters 242 and 246, logic block 258 may control MUX 214 to pass bus 208 to bus 218. If counter 246 has a value that is higher than the values of counters 242 and 244, logic block 258 may control MUX 214 to pass bus 210 to bus 218.

Bit extractor 200 may comprise a final state machine (FSM) 260, to generate and output signals 76, 248, 250 252 and 256. Accordingly, signals 76, 248, 250 252 and 256, as a group, may be in one of three states, arbitrarily numbered here as states #0, #1 and #2. In general, the number of states produced by FSM 260 for its output signals may be equal to the number of bits in a cluster.

At state #0, FSM 260 may set signals 248, 250 and 252 so that MUXs 236, 238 and 240 output the output of adders 232, 234 and 230, respectively, FSM 260 may command counters 242, 244 and 246 to count, and FSM 260 may output a logic value "0" on signal 76.

At state #1, FSM 260 may set signals 248, 250 and 252 so that MUXs 236, 238 and 240 output the output of adders 234, 230 and 232, respectively, FSM 260 may command counters 242, 244 and 246 to count, and FSM 260 may output a logic value "0" on signal 76.

At state #2, FSM 260 may set signals 248, 250 and 252 so that MUXs 236, 238 and 240 output the output of adders 230, 232 and 234, respectively, FMS 260 may command counters 242, 244 and 246 to count, and FSM 260 may output a logic value "1" on signal 76.

FSM 260 may switch the state of signals 76, 248, 250 252 and 256 once in response to a word of word sequence 68 received to bit extractor 200. Moreover, FSM 260 may switch the state of signals 76, 248, 250 252 and 256 in a predefined order that may be, for example, state #0 to state #1, state #1 to state #2 and state #2 to state #0.

Due to the structure of bit extractor 200 and the method in which signals 76, 248, 250 252 and 256 are generated, words of word sequence 68 that are received into register A are checked by comparators 220, 221, 222, 223, 224, 225, 226, 227 and 228 for equality of consecutive bits. Adders 230, 232 and 234 sum the results from the respective groups of comparators and counters 242, 244 and 246 are incremented or decremented accordingly. MUX 214 may be set to pass one of buses 208, 210 and 212 according to the values of counters 242, 244 and 246, and once in every three words signal 76 may have a logic "1" value to signal digital circuitry 78 to receive an extracted word from bus 218.

The sensitivity of signals 216 to changes in values of 242, 244 and 246 may be related to the value in threshold register 254. The closer this value is to the lower threshold, the more sensitive signals 216 may be to changes in the aligmnent of encoded symbols in register A.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the spirit of the invention.

What is claimed is:

1. A method comprising:
preparing symbols for transmission by representing each bit of said symbols by a cluster of N consecutive bits, identical to said bit, in a transmission bit sequence;
transmitting said transmission bit sequence at a particular bit rate;
receiving a reception bit sequence of received bits at said particular bit rate, said reception bit sequence identical to said transmission bit sequence in the absence of errors; and
reconstructing said symbols from said reception bit sequence of received bits by:
a) identifying boundaries of clusters of N received bits in said reception bit sequence by comparing neighboring received bits; and
b) selecting an inner bit of each of said clusters of N received bits as a bit of a reconstructed symbol.

2. The method of claim 1, wherein identifying boundaries of said clusters of N received bits in said reception bit sequence includes:
counting differences between consecutive received bits;
generating probabilities for N possible cluster boundary alignments in said reception bit sequence; and
identifying said boundaries according to the one of said N possible cluster boundary alignments having the highest probability.

3. The method of claim 2, wherein generating said probabilities includes ensuring that said probabilities do not exceed a programmable threshold, said programmable threshold determining a sensitivity of boundary identification to changes in boundary alignment.

4. The method of claim 1, wherein transmission of said transmission bit sequence and reception of said reception bit sequence conform to the Peripheral Components Interconnect (PCI) Express Specifications Revision 1.0a published Mar. 31, 2003 by the PCI Special Interest Group (SIG).

5. An integrated circuit comprising:
a line receiver to receive over a conductive medium a reception bit sequence of received bits at a particular bit rate, wherein said reception bit sequence is, in the absence of errors, identical to a transmission bit sequence transmitted over said conductive medium at said particular bit rate, and wherein said transmission bit sequence includes a cluster of N consecutive identical bits for each bit of a symbol to be transmitted;
a de-serializer to pack consecutive received bits of said reception bit sequence into words and to output a word sequence of said words; and
a bit extractor to receive said word sequence, to extract extracted bits from said word sequence at a fraction of said particular bit rate, to pack said extracted bits into extracted words, and to output an extracted word sequence of said extracted words.

6. The integrated circuit of claim 5, wherein said symbols are ten-bit symbols encoded from bytes of information bits.

7. The integrated circuit of claim 5, further comprising digital circuitry to receive said extracted word sequence and to identify boundaries of said symbols in said extracted word sequence.

8. The integrated circuit of claim 5, wherein a single bit of said symbols is to be represented in said extracted word sequence by a single bit.

9. The integrated circuit of claim 8, wherein said bit extractor includes N memory elements, and the number of bits in one of said memory elements is equal to a number of bits in one of said symbols.

10. The integrated circuit of claim 9, wherein said bit extractor fuirther includes a multiplexer having N input buses and an output bus, the number of bits in one of said input buses and in said output bus is equal to the number of bits in one of said symbols, and wherein bits in one of said memory elements that are separated by N bits are received by one of said input buses.

11. The integrated circuit of claim 10, wherein said bit extractor further includes N groups of equal numbers of comparators, wherein said comparators are to compare different pairs of consecutive bits of a particular memory element of said memory elements.

12. The integrated circuit of claim 11, wherein said comparators are XOR gates.

13. The integrated circuit of claim 11, wherein said bit extractor further includes:
N counters to contain values that are no less than a lower threshold and no more than a programmable threshold, wherein a counter of said counters is capable of being incremented and is capable of being decremented according to output values of said comparators, and
wherein said output bus of said multiplexer is to receive values of a particular input bus of said input buses, said particular input bus selected by said multiplexer according to said values of said counters.

14. The integrated circuit of claim 5, wherein the number N of bits in said cluster is three.

15. An apparatus comprising:
a conductive medium;
a first integrated circuit to generate a transmission bit sequence having a cluster of N consecutive identical bits for each bit of a symbol to be transmitted and to transmit said transmission bit sequence over said conductive medium at a particular bit rate; and
a second integrated circuit to receive a reception bit sequence of received bits over said conductive medium at said particular bit rate, wherein said reception bit sequence is identical to said transmission bit sequence in the absence of errors, said second integrated circuit comprising:
a de-serializer to pack consecutive received bits of said reception bit sequence into words and to output a word sequence of said words; and
a bit extractor to receive said word sequence, to extract extracted bits from said word sequence at a fraction of said particular bit rate, to pack said extracted bits into extracted words, and to output an extracted word sequence of said extracted words.

16. The apparatus of claim 15, wherein said symbols are ten-bit symbols encoded from bytes of said information bits.

17. The apparatus of claim 15, further comprising digital circuitry to receive said extracted word sequence and to identify boundaries of said symbols in said extracted word sequence.

18. The apparatus of claim 15, wherein a single bit of said symbols is to be represented in said serial representation by a cluster of N consecutive equal bits and in said extracted word sequence by a single bit, wherein N is the number of bits in said cluster.

19. The apparatus of claim 18, wherein the number N of bits in said cluster is three.

20. The apparatus of claim 18, wherein said bit extractor includes N memory elements, and the number of bits in one of said memory elements is equal to a number of bits in one of said symbols.

21. The apparatus of claim 20, wherein said bit extractor further includes a multiplexer having N input buses and an output bus, the number of bits in one of said input buses and in said output bus is equal to the number of bits in one of said symbols, and wherein bits in one of said memory elements that are separated by N bits are received by one of said input buses.

22. The apparatus of claim 21, wherein said bit extractor further includes N groups of equal numbers of comparators, wherein said comparators are to compare different pairs of consecutive bits of a particular memory element of said memory elements.

23. The apparatus of claim 22, wherein said comparators are XOR gates.

24. The apparatus of claim 22, wherein said bit extractor further includes:
   N counters to contain values that are no less than a lower threshold and no more than a programmable threshold,
   wherein a counter of said counters is capable of being incremented and is capable of being decremented according to output values of said comparators, and
   wherein said output bus of said multiplexer is to receive values of a particular input bus of said input buses, said particular input bus selected by said multiplexer according to said values of said counters.

25. The apparatus of claim 15, further comprising:
   an antenna.

26. The apparatus of claim 15, wherein communication over said conductive medium conforms to the Peripheral Components Interconnect (PCI) Express Specifications Revision 1.0a published Mar. 31, 2003 by the PCI Special Interest Group (SIG).

27. The apparatus of claim 15, wherein the apparatus is a computer.

* * * * *